Oct. 7, 1947.  O. R. NEMETH  2,428,719
ADJUSTABLE LENS MOUNT
Filed Sept. 16, 1944  2 Sheets-Sheet 2

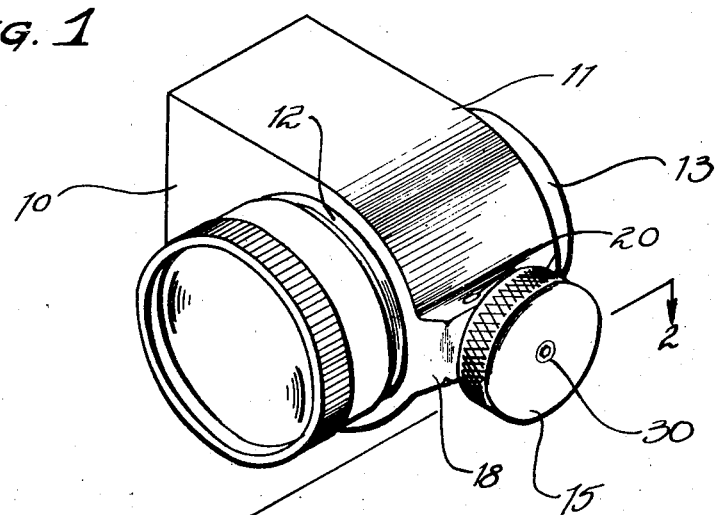
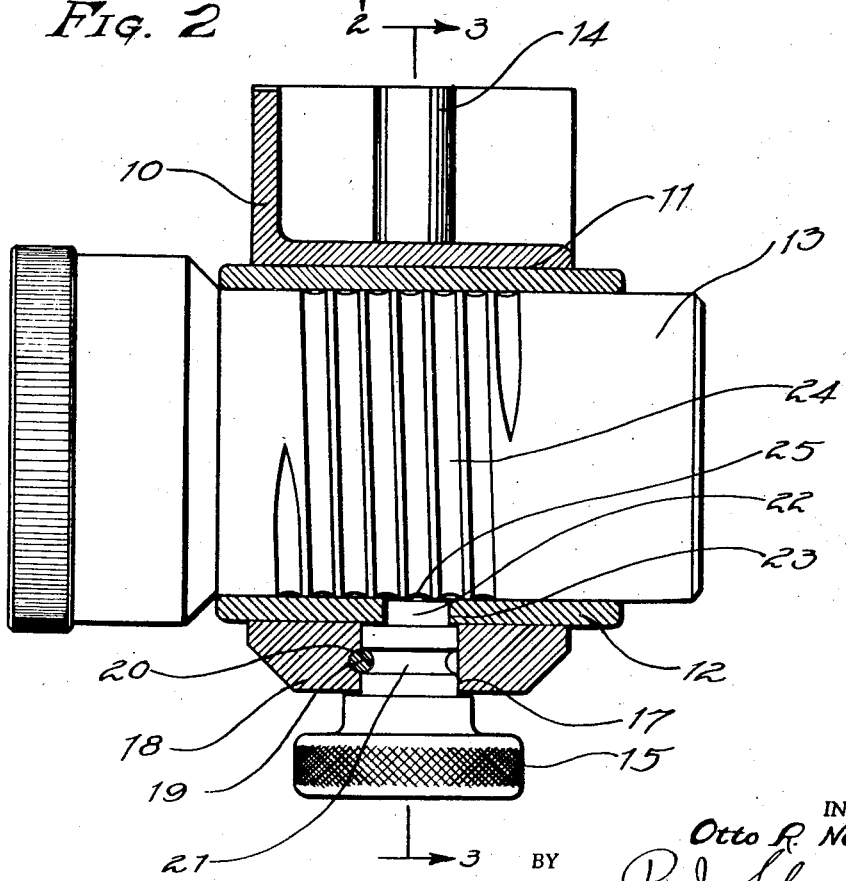

INVENTOR.
Otto R. Nemeth
BY R. J. Schwarz
ATTORNEY.

Patented Oct. 7, 1947

2,428,719

UNITED STATES PATENT OFFICE 2,428,719

ADJUSTABLE LENS MOUNT

Otto R. Nemeth, Chicago, Ill., assignor, by mesne assignments, to Helene Curtis Industries, Inc., a corporation of Illinois Application September 16, 1944, Serial No. 554,358

2 Claims. (Cl. 88—57)

1

This invention relates to improvements in the mounting of lenses, and more especially lenses that must be adjusted on more or less frequent occasions to secure proper focusing.

An important object of the present invention is to provide improved means for effecting ultra-fine focusing adjustment of a lens unit.

Another object of the present invention is to provide improved lens supporting means adapted to permit both coarse and ultra-fine focusing adjustments.

Still another object of the invention is to provide novel lens focusing means adapted to effect adjustment movement of a lens unit in respective opposite directions by manipulation of a manual adjustment device in but one direction.

A further object is to provide improved means for adjusting a lens unit selectively in opposite directions without mechanical slack, pause or dwell in the transition between the opposite adjustment movements.

Other objects, features, and advantages of the invention will be readily apparent from the following description and the accompanying two sheets of drawings illustrating a certain preferred embodiment of the invention, and in which:

Figure 1 is a perspective view of a lens mount including the features of the invention.

Fig. 2 is a sectional plan view taken substantially along the line 2—2 of Fig. 1.

Figure 3:
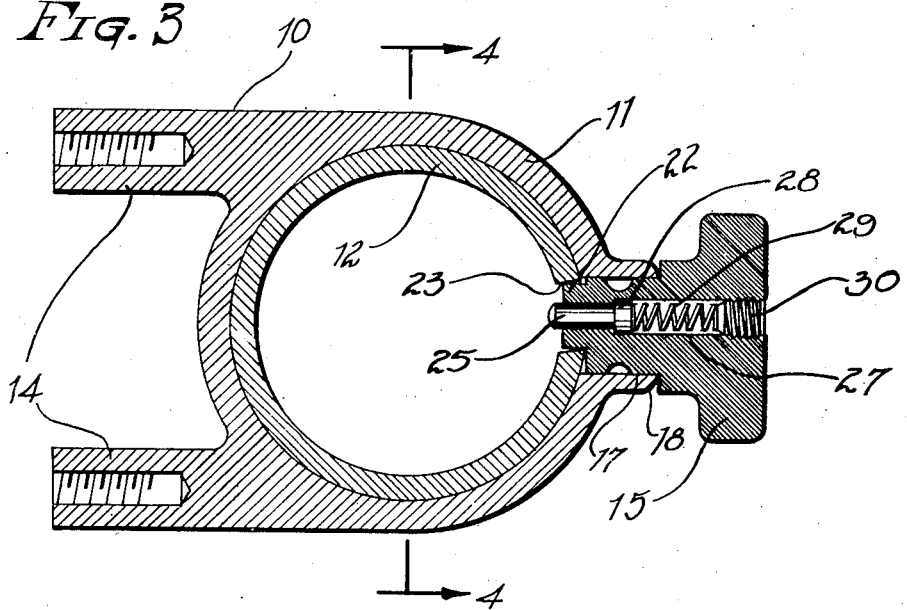
Fig. 3 is a vertical sectional view through the lens mount taken substantially along the line 3—3 of Fig. 2, but showing the parts in a different operative relationship.

My invention has utility in various environments wherein a lens unit must be critically focused with respect to a point or surface in front of the lens. By way of example may be mentioned motion picture or still picture projection apparatus, cameras, microscopes, telescopes, etc.

Having more particular reference to the drawings, a typical unit embodying the features of the invention includes a lens support 10 of any preferred specific construction including a tubular eye 11 adapted to receive a freely slidable and preferably slightly longer sleeve 12 internally dimensioned for slidably embracing a lens unit tube 13. The supporting member 10 may conveniently be formed as a casting having tapped bosses 14 projecting from one side of the eye 11 for engagement with the supporting structure of an apparatus (not shown) for attachment thereto by means of bolts threaded into the bosses.

Major or coarse adjustment of the lens, that is adjustment movement of the lens unit by relatively large steps, to attain the general focal range is accomplished by sliding the lens tube 13 for-

2 wardly or rearwardly within the sleeve 12. Extremely fine degrees or shades of critical adjustment are accomplished by longitudinal movement of the sleeve 12 within the eye 11. In addition relatively rapid adjustment of the lens in between the coarse and the fine adjustment may be enabled by a relatively coarse pitch threading of the lens tube 13.

According to the present invention, longitudinal shifting of the sleeve 12 either forwardly or rearwardly for fine focusing adjustment of the lens is accomplished by means which is adapted to effect a full cycle of adjustment shifting in response to movement in but one direction. In a preferred form such means comprises a knob 15 which is rotatably mounted within a bore 17 extending radially through preferably the longitudinal center of the eye 11 and an integral knob-supporting boss 18 projecting radially outwardly from the eye. Means for holding the knob against axial displacement from the bore 17 may comprise a retaining pin 19 which is received within a bore 20 cutting through on the chord of the bore 17 and engaging within an annular groove 21 in the reduced diameter shank of the knob within the bore 17. This arrangement enables free rotation of the knob 15 continuously clockwise or counter-clockwise as preferred.

Figure 4:
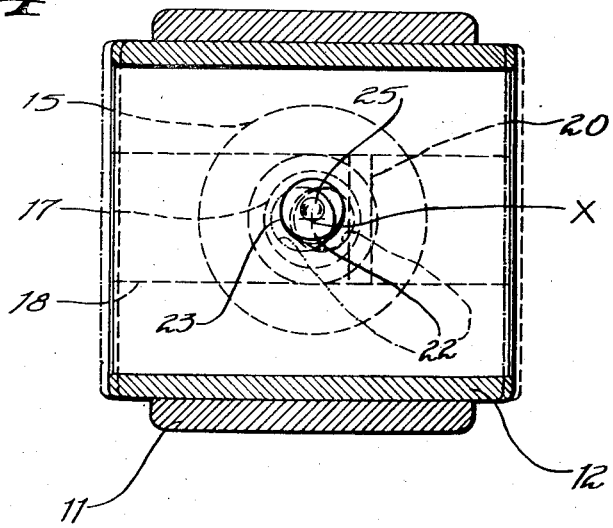
Fig. 4 is a vertical sectional view through the lens mount taken substantially in the plane of line 4—4 of Fig. 3.

For adjustment movement of the sleeve 12 by rotation of the knob 15 an eccentric cylindrical boss 22 projecting from the inner end of the knob shank is received within a follower recess or socket 23 in the wall of the sleeve 12. In the present instance the socket 23 is simply a circular perforation of a diameter to receive the eccentric 22 closely but to enable free, smooth rotation of the eccentric within the perforation while traveling a circular orbit about the axis, identified at X in Fig. 4, of the knob 15 during rotation of the knob. As a result, each 360° rotation of the knob 15 carries the eccentric 22 through a complete orbit and effects movement of the lens-carrying sleeve 12 longitudinally throughout a reciprocal fine adjustment range between forward and rearward limits. As it is shown in Fig. 2, the eccentric 22 is in a position wherein the sleeve 12 is at its rearward limit of adjustment, while in Fig. 3 the eccentric is in one of its half way positions, that is, it has the sleeve 12 at the midpoint, as indicated in full line in Fig. 4, between the extreme rearward and forward positions of adjustment as respectively indicated in broken outlines. While moving the sleeve longitudinally, the eccentric 22 also incidentally oscillates the tube slightly, but such oscillation is without any detriment to focusing of the lens because it is strictly on, and without any deviations from, the optical axis of the lens.

A very important advantage of my continuous orbit rotary eccentric adjustment of the lens carrying sleeve 12 resides in the ultra-fine forward or backward adjustment without encountering any slack in transition from forward to rearward or return adjustment movement of the sleeve 12 relative to the knob. This results from the continuous driving engagement of the eccentric 22 with the bearing wall defining the socket 23 without any disengagement, overrun or underrun, or clearance slack such as is present in every screw type of adjustment even when of micrometer dimensions. Moreover, the adjustment can be effected easier and more smoothly because of the unusual freedom from such drag as is encountered in a screw adjustment. Extreme accuracy of adjustment is thus greatly facilitated.

The intermediate but relatively coarse screw adjustment of the lens is effected herein by the engagement of a wide semi-circular coarse pitch thread 24 on the periphery of the lens tube 13 with an element 25 which protrudes inwardly of the sleeve 12 into the thread. Herein the thread engaging element 25 advantageously comprises a detent extending axially from the eccentric 22. For this purpose the knob 15 is formed with an eccentric bore 27 concentric with the eccentric 22 within which the detent 25 is yieldably slidable within limits defined by a detent head 28 and a compression spring 29 which is held under compression by a retaining screw 30 threaded into the outer end of the bore 27. Through this arrangement coarse longitudinal adjustment of the lens tube 13 is enabled in response to longitudinal sliding force applied to the tube sufficient to effect resilient retraction of the detent 25 and camming thereof over the crests of the threads 24, the resistance to camming displacement of the detent in each camming out affording sensible indication of each coarse graduation of adjustment afforded by the threads for this purpose. Resistance of the detent to displacement, under the influence of the compression spring 29 is sufficient to enable threaded adjustment by riding of the thread 24 along the point of the detent 25 in response to rotation of the lens tube 13 within the carrying sleeve 12. By having the detent 25 coaxial with the eccentric 22, the desired coarse adjustment of the lens tube 13 once established will remain undisturbed throughout orbital movement of the eccentric 22 when effecting fine focusing adjustment of the lens. Hence the lens tube 13 and the carrying sleeve 12 will remain in relatively fixed adjustment during adjustment movement of the sleeve.

While I have illustrated and described a certain preferred embodiment of my invention, it is to be understood that I do not thereby intend to limit my invention to the specific details disclosed, but contemplate that certain modifications, substitutions, and alternative constructions may be effected without departing from the spirit and scope of the invention as defined in the appended claims.

I claim:

1. In combination in a lens mount, a supporting member having a tubular eye, a lens-carrying tube slidably mounted in said eye, a lens-carrying structure slidable in said tube, said tube having a radial socket opening through its periphery, a digitally manipulable rotary member carried by said supporting member and having an eccentric engageable within said socket for effecting longitudinal adjustment of said tube by rotation of the rotary member, and means on said rotary member engaging with the lens-carrying structure for effecting adjustment thereof in unison with adjustment of said tube.

2. In combination in a lens mount, a supporting member having a tubular eye, a lens-carrying tube slidably mounted in said eye, a lens-carrying structure slidable in said tube, said tube having a radial socket opening through its periphery, a digitally manipulable rotary member carried by said supporting member and having an eccentric engageable within said socket for effecting longitudinal adjustment of said tube by rotation of the rotary member, and means on said rotary member engaging with the lens-carrying structure for effecting adjustment thereof in unison with adjustment of said tube, said last named means being yieldable to enable longitudinal adjustment of the lens-carrying structure relative to said tube.

OTTO R. NEMETH.

REFERENCES CITED

The following references are of record in the file of this patent:

UNITED STATES PATENTS

| Number | Name | Date |
| --- | --- | --- |
| 1,649,646 | Badgley | Nov. 15, 1927 |
| 1,848,253 | Howell | Mar. 8, 1932 |
| 1,883,943 | Kindelmann et al. | Oct. 25, 1932 |
| 1,954,876 | Joannides | Apr. 17, 1934 |
| 2,116,704 | Lauhe et al. | May 10, 1938 |
| 2,128,365 | Killman et al. | Aug. 30, 1938 |
| 2,279,476 | Mihalyi | Apr. 14, 1942 |